United States Patent [19]
Aoki et al.

[11] Patent Number: 5,155,681
[45] Date of Patent: Oct. 13, 1992

[54] MOBILE APPARATUS FOR COKE OVEN

[75] Inventors: Takayoshi Aoki; Mitsunori Tsuruhara, both of Sakaide, Japan

[73] Assignee: Mitsubishi Kasei Corporation, Tokyo, Japan

[21] Appl. No.: 704,860

[22] Filed: May 21, 1991

Related U.S. Application Data

[63] Continuation of Ser. No. 339,720, Apr. 18, 1989, abandoned.

[30] Foreign Application Priority Data

Apr. 18, 1988 [JP] Japan .................... 63-094848

[51] Int. Cl.$^5$ .................. B61H 11/00; B61L 3/12; B61L 3/22
[52] U.S. Cl. ................. 364/424.01; 246/182 B; 246/184; 364/426.01
[58] Field of Search ............ 364/426.01, 424.01, 364/424.02, 477; 246/182 B, 187 B, 184; 340/988

[56] References Cited

U.S. PATENT DOCUMENTS 4,181,945  1/1980  Adler et al. ............... 364/424.01 X
4,196,471  4/1980  McClure ..................... 364/477 X
4,218,671  8/1980  Lewis ....................... 340/988 X
4,674,054  6/1987  Ikeda et al. ............. 364/426.01 X
5,018,689  5/1991  Yasunobu et al. ........ 364/426.01 X

FOREIGN PATENT DOCUMENTS 61-182104  8/1986  Japan ..................... 364/426.01
2062297    5/1981  United Kingdom ........ 364/424.01

Primary Examiner—Parshotam S. Lall
Assistant Examiner—Edward Pipala
Attorney, Agent, or Firm—Oblon, Spivak, McClelland, Maier & Neustadt

[57] ABSTRACT

An apparatus for moving from position to position along coke ovens during the production of coke which is capable of stopping at its target stop position with high accuracy and without deteriorating its operating efficiency. In the mobile apparatus, a travel pattern is stored in a computer for controlling the apparatus depending on a target stop position of the apparatus and its travel direction immediately before its stop. As a result, any stop error due to the particular conditions inherent in each target stop position can be eliminated. The computer may include a program for correcting the travel pattern depending on the stop error if any.

5 Claims, 3 Drawing Sheets

MOBILE APPARATUS FOR COKE OVEN

This application is a continuation of application Ser. No. 07/339,720, filed on Apr. 18, 1989, now abandoned.

BACKGROUND OF THE INVENTION

1. Field of the Invention

This invention relates to an apparatus for moving from position to position along coke ovens during the production of coke, and more particularly to a control system of such an apparatus for permitting the apparatus to stop accurately at the predetermined positions.

2. Description of the Prior Art

A coal charging car, a pusher, a coke guide car, and a coke quench car used in a coke retort or coke oven battery during the production of coke are required to stop at the exact position corresponding to each of the individual coke ovens. The allowable error in this instance is within about ±15 mm, which makes it difficult to operate these apparatus automatically. Accordingly, these apparatus are usually operated by an operator while visually confirming the stop positions.

Recently, a system for automatically controlling such an apparatus by a computer, which satisfies the requirements with respect to the strict allowable error, has been proposed and put into practically use. The computer used for such an automatic control is generally programmed so as to generate a stop command to a driving equipment of the apparatus when the apparatus reaches the position of predetermined distance in front of the position where the apparatus is to stop.

However, such an automatic control generally requires a fine adjustment for accurately stopping the apparatus at the predetermined stop positions, which is generally known as "inching operation", because :here is a significant variation of braking distance to completely stop the apparatus after generating stop command from the computer. The number of receptions of such an inching operation could be reduced if the running speed of the apparatus at the lower speed stage just before the generation of the stop command is decreased so that the variation of the braking distance may be minimized. However, his is disadvantageous in that the operating efficiency of the apparatus is significantly damaged.

SUMMARY OF THE INVENTION

The present invention has been made in view of the foregoing disadvantage of the prior art while taking notice of the fact that a variation of the braking distance to stop such an apparatus chiefly depends upon the particular conditions inherent in the positions corresponding to each of the individual coke ovens where the apparatus is to stop, such as, for example, a delicate difference in an inclination of rails on which the apparatus positioned in front of the coke oven as well as external factors, such as, rain, wind and the like which are variable as time passes. Based on these findings, the running pattern of the apparatus of the present invention is decided in accordance with the conditions at the positions where the apparatus is to stop and/or the variation of the external factors.

Accordingly, it is an object of the present invention to provide an apparatus for moving from position to position along coke ovens during the production of coke which is capable of accurately stopping at the positions where the apparatus is to stop without deteriorating its operating efficiency.

In accordance with one aspect of the present invention, there is provided a mobile apparatus for use in a coke oven battery such as, for example, a coke guide car or a quench car. The apparatus includes a means for detecting its own position and repeats a run and stop in accordance with a command generated from a computer having a running pattern stored therein. The running pattern in the computer is stored depending on positions where the apparatus is to stop and its travel direction immediately before its stop. In accordance with another aspect of the present invention, the computer includes a program for correcting the running pattern based on a stop error if any, which is a deviation between an actual stop position of the apparatus and its target stop position.

As can be seen from the foregoing, the mobile apparatus for coke ovens according to the present invention is characterized in that the running pattern :or controlling the apparatus is stored in the computer depending on the target stop position and the travel direction immediately before the apparatus is to stop. According to the present invention, any stop error resulting from conditions inherent in each of the target positions where the apparatus is to stop, such as, for example, an inclination of rails on which the apparatus is positioned, which is not variable with time, is effectively prevented. Another feature of the apparatus of the present invention is to include the corrective program for the travel pattern in the computer for controlling the apparatus if there is a stop error in the apparatus. This makes it possible to reduce effects of external disturbance factors, such as, wind or rain, which is variable with time and cause the stop error, and is particularly useful for an apparatus which is high in air resistance, such as, for example, a coke guide car having a hood for collecting dust.

Accordingly, the mobile apparatus of the present invention includes two features explained hereinabove. More specifically, it is controlled by the computer which includes the program having the running pattern of the apparatus which is stored depending on :he target stop position of the apparatus and its running direction immediately before its stop corrected based on the stop error if any. Also, the mobile apparatus of the present invention includes the position detecting means. The position detector may be those which calculate the position of the apparatus based on the moving distance of the apparatus measured by a touch roller or the like. However, the position detector of this type accumulates errors while running and stopping of the apparatus are repeated. Accordingly, the detector is preferably constructed so as to directly detect its own absolute position by means of a cable arranged along rails on which the apparatus is positioned.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a mobile apparatus for use in a coke oven battery according to an embodiment of the present invention will be described hereinafter with reference to the accompanying drawings.

Figure 1:
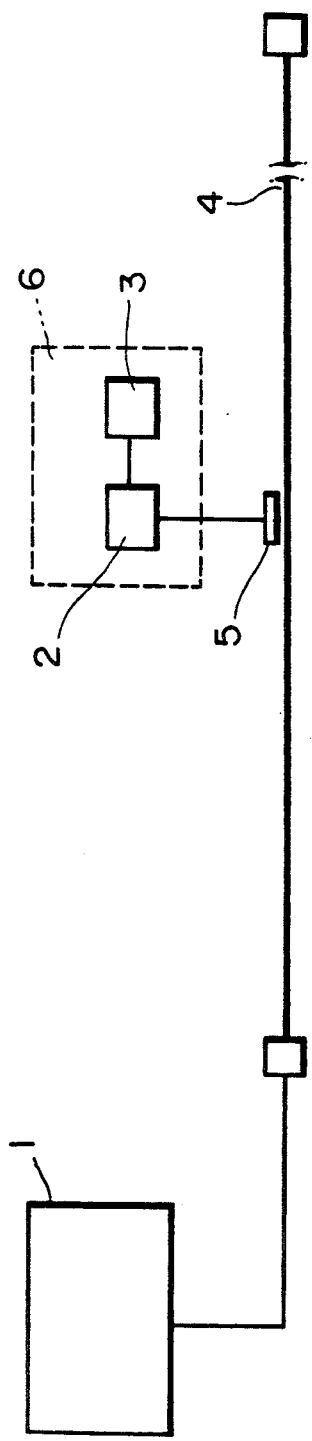
FIG. 1 is a schematic view generally showing an embodiment of a control system for a mobile apparatus for use in a coke oven battery according to the present invention.
Figure 2:
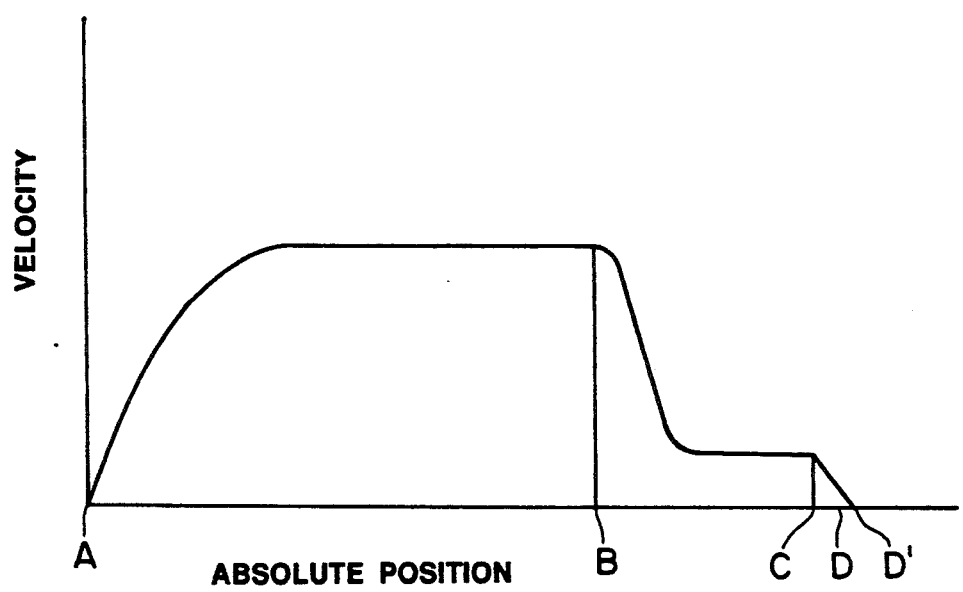
FIG. 2 is a graphical representation showing a travel pattern of the mobile apparatus of FIG. 1.
Figure 3:
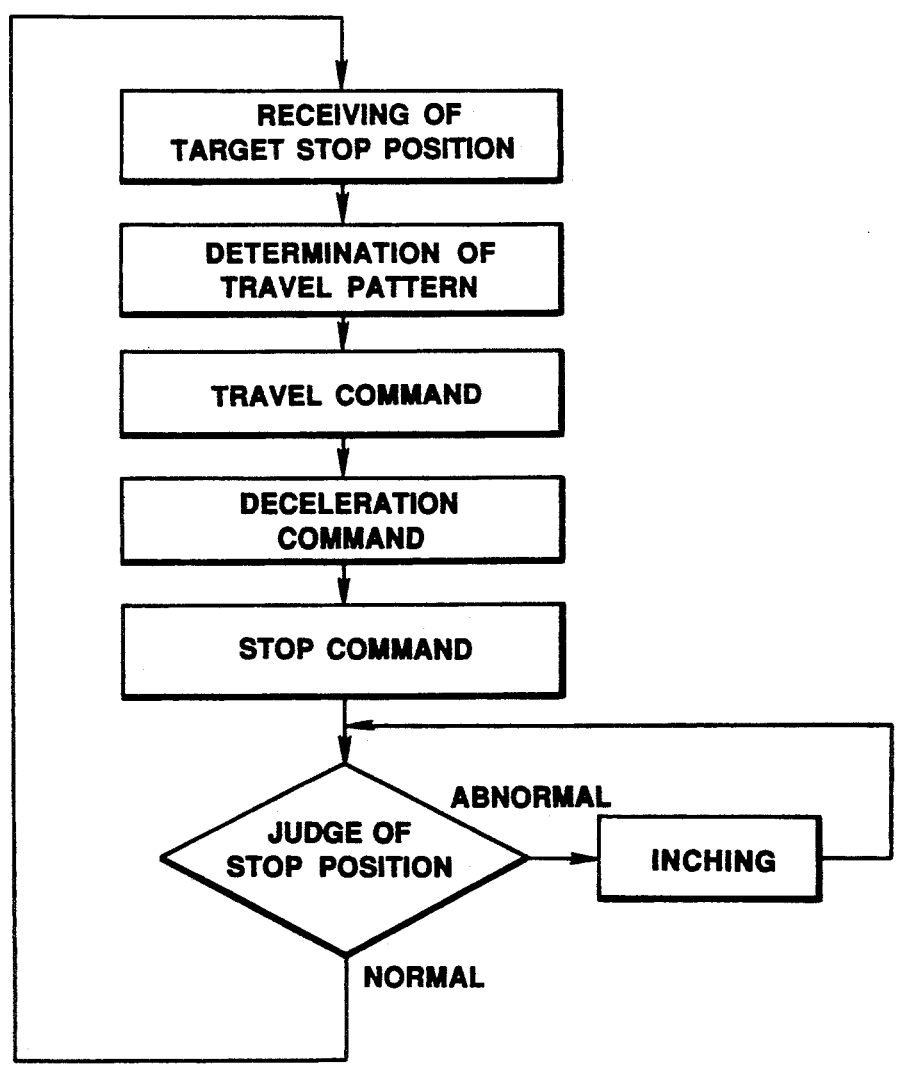
FIG. 3 is a flow chart showing an example of a program for a computer for controlling the mobile apparatus of FIG. 1.

FIGS. 1 to 3 illustrate an apparatus for moving from position to position along coke ovens during the production of coke according to an embodiment of the present invention. In the illustrated embodiment, the apparatus travels while detecting its own absolute position. FIG. 1 schematically illustrates a control system for such a mobile apparatus which includes a fixed station 1 including a computer in which data such as an operating schedule and the like are stored, a driving equipment 3, a vehicular station Z including a computer programmed so as to receive a command generated from the fixed station 1 and to control the driving equipment 3, an absolute position detecting cable 4 arranged along rails on which the apparatus is positioned, an antenna 5, and a working apparatus 6. FIG. 2 shows a travel pattern of the mobile apparatus. In FIG. 2, an axis of abscissas indicates an absolute position of the apparatus, an axis of ordinates indicates a velocity of the apparatus, and reference characters A, B; C, D and D' designate a travel command position, a deceleration command position, a stop command position, a target stop position and an actual stop position, respectively, each of which is indicated by a distance from the reference point.

FIG. 3 is a flow chart showing an example of a Program for a computer for controlling the mobile apparatus of the present invention.

According to the present invention, when the vehicular station 2 on the mobile apparatus at a standstill receives a signal representing the target stop position D at which the motive apparatus is to stop next time from the fixed station, it calculates a travel direction required to reach the target stop position D, the deceleration command position B at which the deceleration command is to be generated, and the stop command position C at which a stop command is to be generated, based on the target position D and the present standing position A of the apparatus where the travel command is received, thereby to determine the travel pattern.

Then, the vehicular station 2 generates a travel command to the driving equipment 3 to start the motive working apparatus 6, which is then accelerated and runs at a constant speed as shown in FIG. 2. When the apparatus 6 reaches the deceleration command position B which is determined to be calculated by the vehicular station 2, it generates a deceleration command to the motive apparatus 6 to have it decelerated and then slowly traveled. When the apparatus 6 slowly travels to the stop command position C which is determined to be calculated by the vehicular station 2, it generates a stop command to the apparatus 6, thereby to stop the apparatus and place the apparatus to await any command or signal from the fixed station 1. In this condition, if the absolute value of a stop error is above the predetermined level, fine adjustment of the actual stop position D' which is known as an inching is repeated until the absolute value reaches the predetermined level or below, and then the apparatus 6 is put in the state of waiting to receive further command or signal.

An important feature of the mobile apparatus according to the present invention resides in a process of determining the travel pattern.

In the conventional motive apparatus similar to that explained with reference to FIG. 1 to 3 in which the travel pattern is not stored depending on its target stop position, the stop command position C is decided to be calculated by either subtracting the positive constant $\delta$ from the target stop position D or adding the positive constant $\delta$ to the target position D depending on its travel direction. That is, the stop command position $C_{A \to D}$ wherein A represents the travel command position and D represents the target stop position is calculated by the following equation (I):

$$C_{A \to D} = D - \delta (A < D) \quad (I)$$
$$D + \delta (A > D)$$

In the conventional practice, the positive constant $\delta$ is determined irrespective of the target stop position and is not automatically corrected. It is an average of braking distances obtained in the past stops.

To the contrary, in the mobile apparatus of the present invention, it is enough that the computer on the vehicular station is so programmed that the stop command generating position $C_{A \to D}$ is determined to be calculated by the following equation (II), preferably equation (III):

$$C_{A \to D} = D - \delta_{D+}(A < D) \quad (II)$$
$$D + \delta_{D-}(A > D)$$

$$C_{A \to D} = D - \delta_{D+} - \sum_{i=1}^{N} e_i/N (A < D) \quad (III)$$
$$D + \delta_{D-} - \sum_{i=1}^{N} e_i/N (A > D)$$

Wherein 67 $_{D+}$ and $\delta_{D-}$ each are the constant corresponding to $\delta$ in the equation (I) and are different from $\delta$ in that $\delta$ is the constant which does not depend on the target stop position, whereas $\delta_{D+}$ and $\delta_{D-}$ are determined depending on the target stop position and the travel direction just before the stop. $\delta_{D+}$ is the value to be employed when the travel direction just before the stop is to increase the absolute position whereas $\delta_{D-}$ is the value to be employed when it is to decrease the absolute position with respect to the same target stop position. It is preferable to determine both values separately, although, both may be equal ($\delta_{D+} = \delta_{D-}$).

$e_1, e_2, ---, e_N$ represent the latest N number of stop errors and $$\sum_{i=1}^{N} e_i/N$$

is an average of the stop errors. The words "stop error" used herein can be defined to be a value obtained by subtracting the target stop position from the actual stop position. Accordingly, it may be negative in some cases. It is to be understood that the stop error does not include a stop error immediately after inching.

The words "travel pattern" used herein is a configuration of a graph indicating relationships between a position of the mobile apparatus and its velocity. However, it is to be understood that the words "storing of travel pattern" used herein does not only mean to store the graph configuration and a velocity of the apparatus at each position as they are, but also means to store data necessary to reproduce the graph configuration such as the deceleration command position, the stop command position and the like in the example described above.

The mobile apparatus of the present invention is not limited to the particular apparatus explained in connection with an embodiment of the present invention. It is to be understood that the present invention is directed to all types of mobile apparatus for use in a coke oven battery irrespective of a type of data to be stored as a travel pattern in the computer, a system of the position detecting mechanism, allotment of parts between the vehicular station and the fixed station and the like so long as it is within the scope of the appended claims.

The present invention will be understood more readily with reference to the following example and comparative example, however, they are intended to illustrate the present invention and are not to be construed to limit the scope of the present invention.

EXAMPLE

A mobile apparatus for use in coke ovens which was constructed as shown in FIG. 1 was operated in the travel pattern as shown in FIG. 2 in accordance with the program as shown in FIG. 3 which is stored in the vehicular station. In order to determine the stop command position $C_{A \to D}$ wherein the character A represents the command position and the character D represents the target stop position according to the equation (II), the mobile apparatus was automatically operated to repeat run and stop operations several times. Then, each stop error $e_i (i = 1, 2, ---, n)$ was calculated, which was expressed as follows:

$$2\sigma = \sqrt[2]{\sum_{i=1}^{n} e_i^2/(n-1)} = 7 \text{ mm}$$

COMPARATIVE EXAMPLE

The mobile apparatus was automatically operated in the same manner as in the above Example except that $C_{A \to D}$ was determined according to the equation (I) instead of equation II). $2\sigma$ was 18 mm ($2\sigma = 18$ mm).

As can be seen from the foregoing, the mobile apparatus of the present invention can stop at its target stop position with high accuracy and without deteriorating its operating efficiency. Accordingly, it is extremely advantageous for an industrial use.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. An apparatus for accurately moving between exact positions along coke ovens during the production of coke, the apparatus comprising:

an absolute position detecting cable means, arranged along rails on which the apparatus is moved, for detecting an absolute position of the apparatus while traveling along the coke ovens;

storing means for storing data representative of a travel pattern of the apparatus between a plurality of a different target stop positions including means for storing each travel pattern depending upon a desired target stop position D of the apparatus and a travel direction of the apparatus to the desired target stop position D;

correcting means for correcting the travel pattern based on a stop error, if any, between and actual stop position of the apparatus and each target stop position as determined by the absolute position detecting cable means; and means for permitting the apparatus to run and stop according to a stop command generated by said storing means.

2. An apparatus according to claim 1, wherein each travel pattern comprises a desired velocity of the apparatus relative to a present comprises a desired velocity of the apparatus relative to a present standing position A of the apparatus, a deceleration command position B at which a deceleration command is generated, a stop command position C at which a stop command is generated and a desired target stop position D.

3. An apparatus according to claim 2, wherein correcting means includes means for generating a stop command position determined by the equation:

$$C_{A \to D} = D - \delta_{D+}(A < D)$$
$$= D + \delta_{D-}(A > D)$$

wherein A represents the present stating position of the apparatus, C represents the stop command generating position, D represents the desired target stop position $\delta_{D+}$ is a constant value representative of an average braking distance determined in dependence on each desired target stop position D and the travel direction of the apparatus to each desired target stop position D when the travel direction of the apparatus just prior to stopping increases the absolute position of the apparatus, and $\delta_{D-}$ is a constant value representative of an average braking distance determined in dependence on each desired target stop position D and the travel direction of the apparatus to each desired target stop position D when the travel direction of the apparatus just prior to stopping decreases the absolute position of the apparatus.

4. An apparatus according to claim 2, wherein the correcting means includes means for generating a stop command position determined by the equation:

$$C_{A \to D} = D - \delta_{D+} - \sum_{i=1}^{N} e_i/N (A < D)$$
$$= D + \delta_{D-} - \sum_{i=1}^{N} e_i/N (A > D)$$

wherein A represents the present starting position of the apparatus, C represents the stop command generating position, D represents the target stop position, $\delta_{D+}$ is a constant value representative of an average braking distance determined in dependence on each desired target stop position D and the travel direction of the apparatus to each desired target stop position D when the travel direction of the apparatus just prior to stopping increases the absolute position of the apparatus, and $\delta_{D-}$ is a constant value representative of an average braking distance determined in dependence on each desired the target stop position D and the travel direction of the apparatus to each desired target stop position D when the travel direction of the apparatus just prior to stopping decreases the absolute position of the apparatus, $e_1, e_2, \ldots, e_n$ represent a latest N number of stop errors and $$\sum_{i=1}^{N} ei/N$$

is an average of said stop errors.

5. An apparatus according to claim 1, wherein the correcting means includes means for correcting the travel pattern based on an average of the most recent number of stop errors.

* * * * *